United States Patent [19]

Kauppi

[11] 3,754,685

[45] Aug. 28, 1973

[54] WIRE ROPE DISCHARGER

[76] Inventor: Pekka Kalervo Kauppi, 918 Malouin St., Sherbrooke, Quebec, Canada

[22] Filed: June 30, 1972

[21] Appl. No.: 267,896

[52] U.S. Cl.................. 222/196, 198/221, 221/268, 222/409, 259/4, 259/47
[51] Int. Cl.............................................. B65g 3/12
[58] Field of Search.................... 222/196, 198, 199, 222/200, 216, 243, 409, 202, 262; 214/17 D; 198/57, 168, 221; 259/4, 47

[56] References Cited
UNITED STATES PATENTS
2,432,852   12/1947   Arvidson......................... 222/409 X FOREIGN PATENTS OR APPLICATIONS
891,135   3/1962   Great Britain...................... 222/196

*Primary Examiner*—Samuel F. Coleman
*Assistant Examiner*—Larry Martin
*Attorney*—Alan Swabey and Guy J. Houle et al.

[57] ABSTRACT

A material discharging system comprising an elongated cable having a plurality of conveying elements fixedly secured, in spaced apart relationship, on the cable. Each conveying element has a diverging side wall for agitating material and opposed ends. A cable receiving hole extends across each conveying element between the ends for receiving a portion of the cable therein. One of the ends defines a conveying surface extending about the cable for engaging material when moved therethrough. The outer periphery of the conveying surface is connected to the side wall by a rearwardly tapered surface for both agitating and discharging the material. Reciprocating means are connected to each end of the cable for reciprocating the cable.

12 Claims, 7 Drawing Figures

Patented Aug. 28, 1973
3,754,685
2 Sheets-Sheet 1
FIG. 1
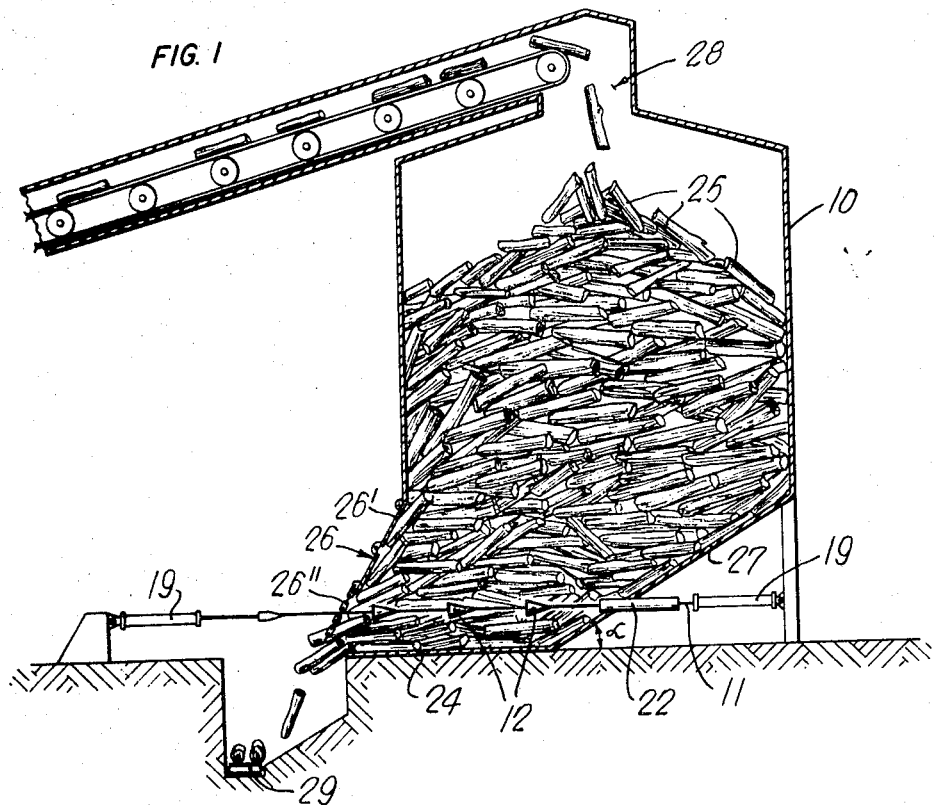
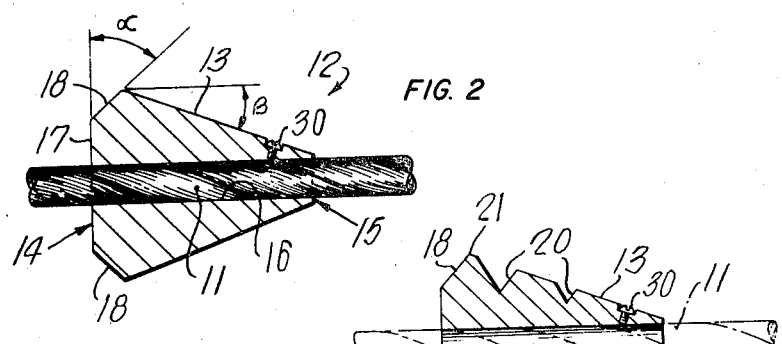
FIG. 2
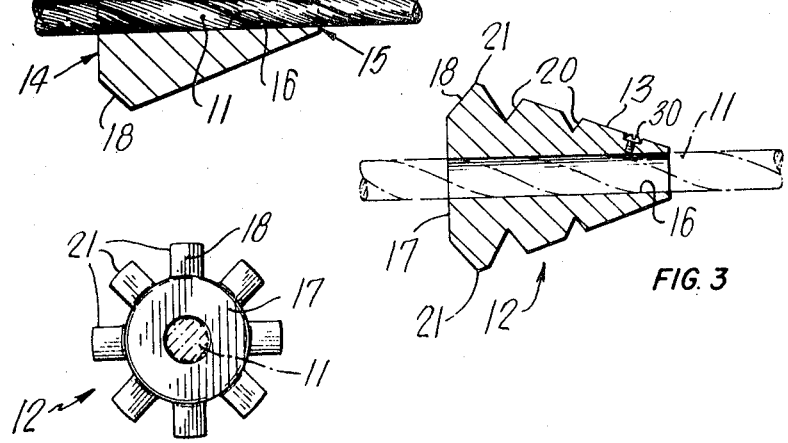
FIG. 3
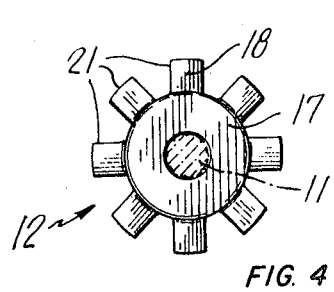
FIG. 4

Patented Aug. 28, 1973

WIRE ROPE DISCHARGER

BACKGROUND OF INVENTION

1. Field of the Invention

The present invention relates to a material discharging system of the type having a reciprocating cable provided with a plurality of conveying elements.

2. Description of Prior Art

The present invention embodies a system which may be stationary or mobile, and more particularly utilizable for unloading bins, silos and related containers, or piles of bulk material such as wood chips, sawdust, asbestos, bark, powders, consistent pulp, paper waste, logs, etc. As an additional application the system can also be used as an arch breaker in silos, where agitation is needed in certain areas, to be able to continuously discharge bulk material by already known apparatus.

There are several known systems for moving material from one place to another and unload material containers and piles, by using reciprocating movement. However, these systems have several disadvantages. Many of them are not suitable for very large storage units or containers. Some of them have additional agitating or supporting members and guides for the conveying or unloading of material located inside the material container or pile, and have indirect contact between unloading elements and the material container. With this arrangement, the unloading of material is disturbed and the material does not move around the supporting members and guides. Installation becomes very costly when all guides and supporting members have to be lined up with conveying elements and the floor prepared for receiving guides. Wearing of guide and conveying members requires substantial maintenance work. Also, a lot of power is lost by the friction between guides and conveying elements.

In some cases the additional supporting members limit the stroke of the conveying elements and does not provide enough flexibility for long strokes desirable for stationary bin and pile applications. Some prior art systems do not discharge material from the back wall area of the container but packs it up in this area when the discharge opening is in one side or in the middle of the container.

These existing systems are not practical for wide and long material piles or bins bacause the conveying unit cannot be made movable lengthwise, while conveying elements are reciprocating across the bin or pile. Supporting members and guides for discharging elements located inside the bin or pile are not practical and no direct or indirect contact between discharging elements and floor or walls, except indirect contact through material is an essential requirement for a trouble free and flexible system.

There are some known systems for unloading vertical silos with arch breakers in them. Arch breakers are usually driven by the unloading system and cannot operate independently inside the silo. Where effective agitation of material is needed, these arch breakers do not reach all critical areas inside the silo and are not very reliable.

SUMMARY OF INVENTION

A feature of the unloading system of the present invention substantially overcomes disadvantages of known systems and provides a system for unloading many different kinds of material automatically from any shape of material containers and piles and can be built as a stationary system or a movable one. When the whole conveying system is moving lengthwise of the pile or material container, the conveying elements are discharging material across the pile or material container. For wide and very long outside wood chip piles the movable conveying unit provides the solution for the problem of unloading them in the order of "first-in-first-out" automatically without using any bull dozers or labour. The cost of unloading such piles will be substantially reduced. When using bulldozers, as heretofore done, there is increased compaction of material in some areas which can cause temperature increases and creating a fire hazard. That possibility is substantially overcome by this system. The chip piles will be easily controlled and the material evenly aged, which is a very important factor for further process of some material. Furthermore there will be no loss of wood substance or damaged chips or over-storing by a human mistake. For sawdust or other materials which become icy in the cold weather, the movable conveying unit of the present invention provides a very reliable way to unload the material continuously without causing cavities to build up inside the material.

According to the above features, from a broad aspect, the present invention provides a material discharging system comprising an elongated cable having a plurality of conveying elements fixedly secured, in spaced apart relationship, on the cable. Each conveying element has a diverging side wall and opposed ends. A cable receiving hole extends across each conveying element between the ends for receiving a portion of the cable therein. One of the ends defines a conveying surface extending about the cable for engaging material when moved therethrough. The outer periphery of the conveying surface is connected to the side wall by a rearwardly tapered surface for both agitating and conveying the material. Reciprocating means are connected to each end of the cable for reciprocating the cable.

BRIEF DESCRIPTION OF DRAWINGS

A preferred embodiment of the present invention will now be described with reference to the examples of application of the system as shown in the enclosed drawings in which;

FIG. 1 is a sectional side view of a wood log bin embodying the discharging system of the present invention;

FIG. 2 is a sectional side view of a conveying element;

FIG. 3 is a sectional side view of a further conveying element;

FIG. 4 is an end view of a still further conveying element;

DESCRIPTION OF PREFERRED EMBODIMENTS

Figure 7:
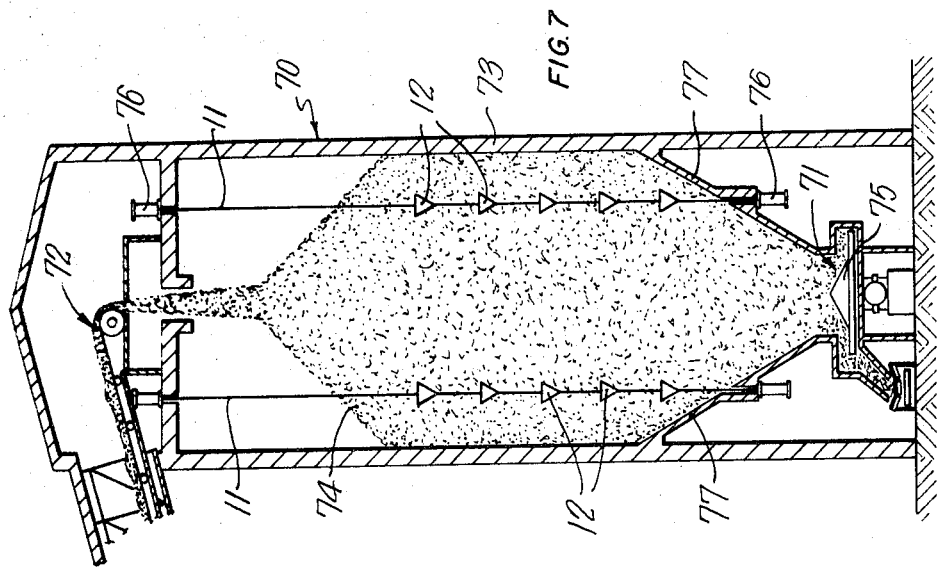
FIG. 7 is a sectional side view of a silo container showing the system used as an arch breaker.

Referring to the drawings and more particularly to FIG. 1, there is shown the material discharging system of the present invention as applicable to a wood log bin or container 10. The discharging system consists essentially of one or more elongated bars or cables 11, each having a plurality of conveying elements 12 secured thereon in spaced apart relationship.

Referring now additionally to FIGS. 2, 3 and 4, there is shown the construction of the conveying elements 12, as having a substantially conical shape defining a diverging sidewall 13 and opposed ends 14 and 15, a cable receiving hole 16 extends across the conveying element 12 between the ends 14 and 15 for receiving a portion of an associated cable 11 therein and secured thereto by fastening means such as screw 16. The end 14 has a wall defining a conveying surface 17 extending about the cable 11 for engaging material such as logs 25 (see FIG. 1) when moved through the container 10. The outer periphery of the conveying surface 17 is integrally connected to the sidewall 13 via a rearwardly tapered surface 18 which is provided for both agitating and conveying the material when moved relative thereto. The surface 18, in the discharging stroke, pushes material angularly upwards and frontwards whereby the material around the immediate area of the conveying element 12 is agitated to prevent tunnel forming along the axis of movement of the cable 11. During the return stroke (opposite to discharge stroke) the sidewall 13 pushes and agitates the material in substantially all directions to assure that the material will be discharged on the next discharge stroke.

FIG. 3 shows a modification of the conveying element 12 wherein one or two annular grooves 20 herein shown of substantially v-shape cross-section are provided in the sidewall 13. The grooves 20 may be of different size and improve the agitation of the material in storage. The need for agitation varies with different kinds of materials. FIG. 4 shows a still further modification of the conveying element 12 wherein the sidewall 13 is divided into radial members 21 to define a star-shaped element. A wire rope cable 11 is used as the flexible carrier to provide necessary strength for large installations. The conveying elements 12 can be casted directly on cable 11 or clamped on them. They can be made of steel, aluminum, rubber or any other suitable material. The shape of the conveying elements can vary from one installation to another and be different from the stationary and the mobile system. The cross-section of the elements 12 can be round, square, triangular or star-shaped.

As can be seen from FIG. 1, the opposed ends of each cable 11 is connected to reciprocating means, herein shown as piston 19 whereby the conveying elements 12 are reciprocated adjacent to floor 24 of the container 10. Hereinshown, the container 10 is provided with a discharging opening 26 comprising hinged doors 26' and a flexible end section 26" constituted by chain sections. The opening 26 is provided in a sidewall of the container adjacent the floor thereof. The opposed sidewall has a sloped section 27 extending from the floor 24 to direct the material or logs 25 towards the discharge opening 26. A rod-like element 26 is also secured to the cable 11 and is reciprocated within a close fitting opening in the sloped wall section 27. The front face of the rod-like element 22 also helps in discharging the material and especially from the back wall area where material may have a tendency to compact. The logs 25 are stored in the container 10 through top inlet 28 and discharged at the bottom onto a conveyor 29 by the discharging system of the present invention.

In order to provide high unloading rate and proper agitation of certain type materials it is found preferable to operate with two or more cables moving side by side and unloading material together while the next pair is moving in the opposite direction, etc. As shown in FIG. 1, the conveying system "floats" in the material, that is, it is held above the base of the material. The discharging system of the invention is made especially for long strokes by using reciprocating movement. The long stroke is preferable for use in unloading sawdust and powders because of the great compaction of these materials. In the beginning of the stroke material compacts and moves mainly in the front area of conveying elements 12 only, and after compacting the material starts to move between elements 12, adjacent cables, and the floor 24.

When using the discharging system in material containers where the discharging opening is in the middle or on one side only, the material close to the backwall can be discharged very easily by using rod-like conveying elements 22 on each carrier where they are going through the wall of the container. The rod-like conveying elements 22 are longer than the stroke and are not supported by the wall. They enter into the container a distance equal to the length of the stroke. This arrangement prevents the compacting of the material in the wall areas and discharging of material can be done very evenly throughout the container floor area.

The unloading system is very easy to assemble and maintain because there is no contact between the unloading system, material container or the material pile foundation. The discharge rate of the material can be changed by varying the reciprocating speed of the pistons 19 at each end of the cable 11.

Figure 5:
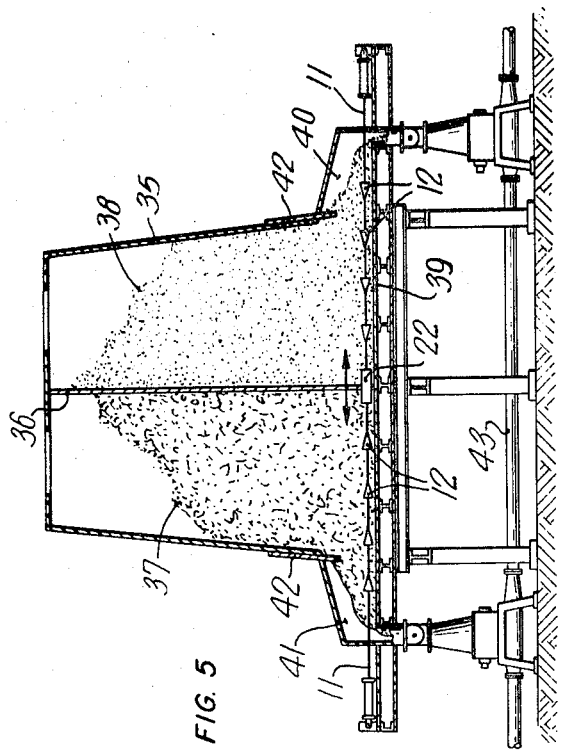
FIG. 5 is a sectional side view of a stationary system.

FIG. 5 shows a further arrangement of the discharging system of the stationary type as applied to a container 35 having the storage area divided into two sections by a vertical dividing wall 36 wherein two different types of material can be stored within the container, i.e., a hardwood pile 37 and a softwood pile 38. A plurality of cables 11 each having a rod-like element 22 at the center thereof and a plurality of conveying elements 12 spaced apart on each side of the element 22, are supported above the floor 39 of the container 35. The cables 11 are positioned side-by-side and substantially, although not essentially, in a horizontal plane. The conveying elements 12 on each side of the rod-like element 22 have their conveying surface 17 facing outwardly from the dividing wall 36 towards a respective discharge opening 40 and 41 provided at the base of opposed walls of the container. Variable gates 42 are secured to the discharge openings 40 and 41 to adjust the discharge rate of the material through the openings. The materials 37 and 38 can thus be fed in predetermined quantities to a discharge conveyor 43, herein shown as a pipe conveyor.

Figure 6:
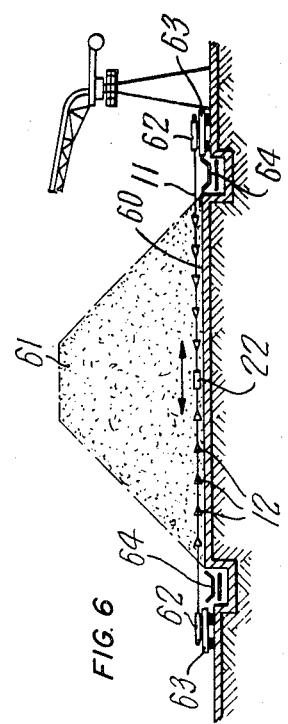
FIG. 6 is a sectional side view of a mobile system.

Referring to FIG. 6, there is shown a still further arrangement of the discharging system. Hereinshown, the system is used as a mobile discharger consisting of two or more elongated cables 11 spaced side-by-side and supported adjacent the base 60 of a pile 61 of material. Each end of each cable is secured to a piston 62 which is mounted on a moving carriage 63 having a plurality of conveying elements 12 mounted with their conveying surface 17 facing away from the center of the pile 61. As the cables 11 are reciprocated by the pistons 62 the material is discharged from the bottom of the pile 61, from opposed sides, onto a conveyor 64. A rod-like element 22 may be secured to the center of each cable.

This system provides the solution to the problem of unloading the material, such as wood chips, in the order of first-in-first-out therefore discharging material which is substantially evenly aged. This system is also particularly advantageous for unloading sawdust material in cold weather without causing cavities to form inside the material.

In the mobile system for long piles there can be several units operating separately in the different areas of the pile. It is very easy to install an additional unit to operate in the pile if material requirements should increase at a future date. Another advantage with the mobile system is that the discharging members can be moved outside at the end of the pile for easy inspection of the unloading unit.

FIG. 7 shows the discharging system as used as an arch breaker. Hereinshown, material 74 is stored in a vertical silo 70. The material 74 is stored from a top discharger 72 and discharged from a bottom opening 71 provided with a driven discharge disc 75. In order to prevent the material 74 from compacting in the area adjacent the side-wall 73 of the silo 70 one or more cables 11 having a plurality of conveying elements 12 are secured vertically into the silo 70 adjacent the sidewall 70. The cables 11 are reciprocated by pistons 76 secured to the ends of each cable 11. In this application all of the conveying elements 12 have their conveying surface 17 facing upwardly so that reciprocation of the elements 12 causes the material 74 to flow downwardly and prevent build-up in the area adjacent the sidewall 73 above the bottom conical wall 77.

As mentioned heretofore, the conveying elements 12 are shaped such that during operation, that is, reciprocation through a material to be discharged, the conveying elements 12 will both unload the material and/or agitate same. The front face or conveying surface 17 provides the main conveying area to carry the material. The tapered surface 18 lies at a predetermined angle in order to provide the necessary forcing of the material between the cables 11 and also provides the agitating force in all directions, to the material adjacent to each element 12. The system can be used as a stationary or mobile discharger to discharge a stored pile of material.

I claim:

1. A material discharging system comprising an elongated cable, a plurality of conveying elements fixedly secured on said cable in spaced apart relationship, each said conveying elements having a diverging sidewall for agitating material and opposed ends, a cable receiving hole extending across said conveying element between said ends for receiving a portion of said cable therein, one of said ends having a wall defining a conveying surface extending about said cable for engaging material when moved therethrough, the outer periphery of said conveying surface being connected to said sidewall by a rearwardly tapered surface for engaging and agitating said material, and reciprocating means connected to each end of said cable for reciprocating same.

2. A material discharging system as claimed in claim 1 wherein each said conveying elements are of substantially longitudinal triangular cross-section, said sidewall of each said conveying elements extending from one end of said element slightly above said cable and diverging upwardly therefrom to said tapered surface which slopes downwardly outwards to the outer periphery of said conveying face.

3. A material discharging system as claimed in claim 2 wherein said conveying face extends perpendicular to the longitudinal axis of said cable receiving hole.

4. A material discharging system as claimed in claim 2 wherein said sidewall is of round, square or star-shaped cross-section.

5. A material discharging system as claimed in claim 2 wherein said sidewall is provided with one or more annular grooves disposed transverse to the longitudinal axis of said cable receiving hole.

6. A material discharing system as claimed in claim 1 wherein said reciprocating means is a piston secured to each end of said cable.

7. A material discharging system as claimed in claim 1 wherein there is provided one or more elongated cables spaced side-by-side and supported adjacent the floor of a container in which said material is stored, said container having a discharge opening in a portion thereof adjacent said floor, each said cables extending across said container whereby said conveying elements are positioned within said material for discharge of said material through said discharge opening when said cable is reciprocated.

8. A material discharing system as claimed in claim 7 wherein a rod-like element is secured substantially halfway onto each said cable, said plurality of conveying elements being positioned on each side of said rod-like element with the conveying face of said elements on each side facing in opposite direction to said rod-like element whereby said material can be discharged through two discharge openings positioned in adjacent portions of said container adjacent the floor thereof.

9. A material discharging system as claimed in claim 8 wherein a vertical wall divides said container into two sections, said each said rod-like element being positioned for reciprocation in a respective opening in said vertical wall, said conveying elements on a respective side of said rod-like elements discharging material in one of said two sections each of which is associated with one of said two discharge openings, and conveying means for receiving and conveying material discharged into each said discharge openings.

10. A material discharging system as claimed in claim 7 wherein an elongated rod-like element is secured to each said cables and located for reciprocation within an opening in said container wall, said opening being positioned about said cable opposite said discharge opening.

11. A material discharging system as claimed in claim 1 wherein there is provided two or more elongated cables spaced side-by-side and supported adjacent the base of a pile of said material, said reciprocating means being a piston secured to a moving carriage disposed longitudinally on opposite sides of said pile whereby said cables and conveying elements are moved in a horizontal plane while being reciprocated by said piston to discharge said material from of said bottom said pile.

12. A material discharging system as claimed in claim 1 wherein said material is contained within a container having a material inlet and a bottom discharge opening, one or more elongated cables supported vertically within said container adjacent said sidewall, said conveying face of each conveying element facing upwardly from said discharge opening.

* * * * *